US006654720B1

(12) United States Patent
Graham et al.

(10) Patent No.: US 6,654,720 B1
(45) Date of Patent: Nov. 25, 2003

(54) METHOD AND SYSTEM FOR VOICE CONTROL ENABLING DEVICE IN A SERVICE DISCOVERY NETWORK

(75) Inventors: Stephen Glen Graham, Chapel Hill, NC (US); Steven Michael Miller, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,489

(22) Filed: May 9, 2000

(51) Int. Cl.[7] ............................................. G10L 21/00
(52) U.S. Cl. ..................... 704/270; 704/270.1; 704/275
(58) Field of Search .................................. 704/270, 275, 704/270.1; 709/250, 310, 210

(56) References Cited

U.S. PATENT DOCUMENTS

| | | | |
|---|---|---|---|
| 4,665,544 A | 5/1987 | Honda et al. ................ | 379/104 |
| 5,086,385 A | 2/1992 | Launey et al. ............... | 364/188 |
| 5,237,305 A | 8/1993 | Ishikuro et al. ......... | 340/286.01 |
| 5,579,221 A | 11/1996 | Mun ........................... | 364/188 |
| 5,621,662 A | 4/1997 | Humphries et al. .......... | 364/550 |
| 5,657,425 A | 8/1997 | Johnson ...................... | 395/2.84 |
| 5,878,394 A | 3/1999 | Muhling ...................... | 704/275 |
| 6,208,972 B1 * | 3/2001 | Grant et al. ................. | 704/275 |
| 6,405,261 B1 * | 6/2002 | Gaucher ...................... | 709/250 |
| 6,513,063 B1 * | 1/2003 | Julia et al. ................... | 709/219 |

FOREIGN PATENT DOCUMENTS

| | | | |
|---|---|---|---|
| EP | 0772184 | 5/1997 | G10L/3/00 |
| EP | 0911808 | 4/1999 | G10L/12/28 |
| EP | 1045374 | 10/2000 | G10L/15/26 |

OTHER PUBLICATIONS

Rathi, S Blue Tooth Protocol Architecture (2000).*
http://www.hometoys.com/htinews/dec98/reviews/voice-trek/voicetrek.htm, *"Voice Trek version 1.0", Dec. 1998*.
http://www.hometoys.com/htinews/aug97/reviews/homevoic/homevoic.htm, *"Home Voice Version 1.1", Aug. 1997*.
IEEE Transactions on Consumer Electronic, Aug. 1991, vol. 37, No. 3, pp. 395–400, "Solving automation problems using artificial intelligence", G. Evans.
*Home Office Computing, vol. 17, No. 2, p. 68, Feb. 1999, ISSN: 0899–7373, "Now You're Talking", D. Johnson*.
*Edge: Work–Group Computing Report, vol. 8, p. 22, Mar. 3, 1997, "Voice processing: IBM's new voice–enabled Home Director puts IBM Aptiva to work around the house."*

* cited by examiner

Primary Examiner—Susan McFadden
(74) Attorney, Agent, or Firm—Gregory M. Doudnikoff; Carstens, Yee & Cahoon, LLP (57) ABSTRACT

Devices are registered within a zone using a service discovery protocol. At the time of registration, a device sends a grammar and a set of help sequences to a control unit in the zone to be merged into a composite grammar and composite set of help sequences. If the voice command iddued by a user is recognized, an appropriate method invocation is sent to the device to perform the desired operation. If the device in the voice command is recognized but the operation is not recognized, then the user is provided with a help sequence on how to properly perform operations with the device. If the device is not recognized, the command is forwarded to another zone within a set of zones until either the device is found or no such device is located.

36 Claims, 7 Drawing Sheets

| Java Speech Markup Language (JSML) | VoiceCommand MethodInnovations |
|---|---|
| <SENT>Toaster,pop<EMP>up</EMP></SENT> | popUp() |
| <SENT>Toaster,pop<EMP>down</EMP></SENT> | popDown() |
| <SENT>Toaster,<EMP>increase</EMP>temperature</SENT> | incrementTemperature() |
| <SENT>Toaster,<EMP>decrease</EMP>darkness</SENT> | decrementTemperature() |
| <SENT>Toaster,<EMP>help</EMP></SENT> | help() |

FIG. 8

| Word Type | Examples |
|---|---|
| Action | on, start, begin, set, adjust, off, quit, end, stop, finish |
| Numeric | one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, hundred, thousand |
| Attribute | time, temperature, start time, end time, power level, cycle |
| Time Unit | hour, minute, second, AM, PM, Sunday, Monday, Tuesday, Wednesday, Thursday, Friday, Saturday, yesterday, tomorrow, January, February, March, April, May, June, July, August, September, October, November, December, hourly, daily, weekly, monthly, yearly |
| Other Unit | pound, kilogram, Celsius, Fahrenheit |
| Degree | light, heavy, dark, medium, cold, warm, hot, large, small |
| Variation | increase, decrease, longer, shorter, higher, lower, brighter, dimmer |

FIG. 9

| Word Type | Examples |
|---|---|
| Object | toaster |
| Action | pop |
| Attribute | darkness |
| Variation | up, down |

METHOD AND SYSTEM FOR VOICE CONTROL ENABLING DEVICE IN A SERVICE DISCOVERY NETWORK

BACKGROUND OF THE INVENTION

1. Technical Field

The present invention relates generally to improved automation in the home and business and in particular to a method and a system for voice control of devices. Still more particularly, the present invention provides a method and a system for plug-and-play voice control capability exploiting service discovery mechanisms available in the network.

2. Description of the Related Art

Voice control of devices has been investigated for some time and devices are marketed that can respond to simple commands. For example, a cell phone may have a voice controlled directory where telephone numbers are automatically dialed by speaking the name of the person to be called. Often these devices are quite simple and can only respond to a limited number of commands. Rarely can such devices provide help to guide the user through a complex sequence of voice commands.

The technology for voice control is fairly well understood but can be very expensive for a sophisticated system of command and control that supports verbal interactions with the user. As a minimum, such a system would require a microphone, a voice recognition system, a control system for operations performed by voice command, a speech generation system, a speaker, and a microprocessor to coordinate the various activities. To embed this level of sophistication into a simple household device, such as a microwave, or a simple business device, such as a dictation machine, would be prohibitively expensive.

Therefore, it would be advantageous to have voice enabled devices that provide sophisticated voice control, that are capable of interacting with a user, that are plugged in and work immediately, yet devices that are affordable for a typical consumer.

SUMMARY OF THE INVENTION

A method and system provide control for a set of devices through voice commands of a user. Devices are registered within a zone using a service discovery protocol. At the time of registration, a device sends a grammar and a set of help sequences to a control unit in the zone to be merged into a composite grammar and composite set of help sequences. Typically transmission is via a power line information transfer protocol when the device is plugged in or connected, although any means of data communication will suffice. The voice recognition and voice generation hardware and software are shared between all devices within a zone. If the voice command issued by a user is recognized, an appropriate method invocation is sent to the device to perform the desired operation. If the device in the voice command is recognized but the operation is not recognized, then the user is provided with a help sequence on how to properly perform operations with the device. If the device is not recognized, the command is forwarded to another zone within a set of zones until either the device is found or no such device is located. This voice command system can be used in multiple zones of a residence, in multiple zones of a business, or in multiple zones of any "space" occupied by the user, such as an automobile.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
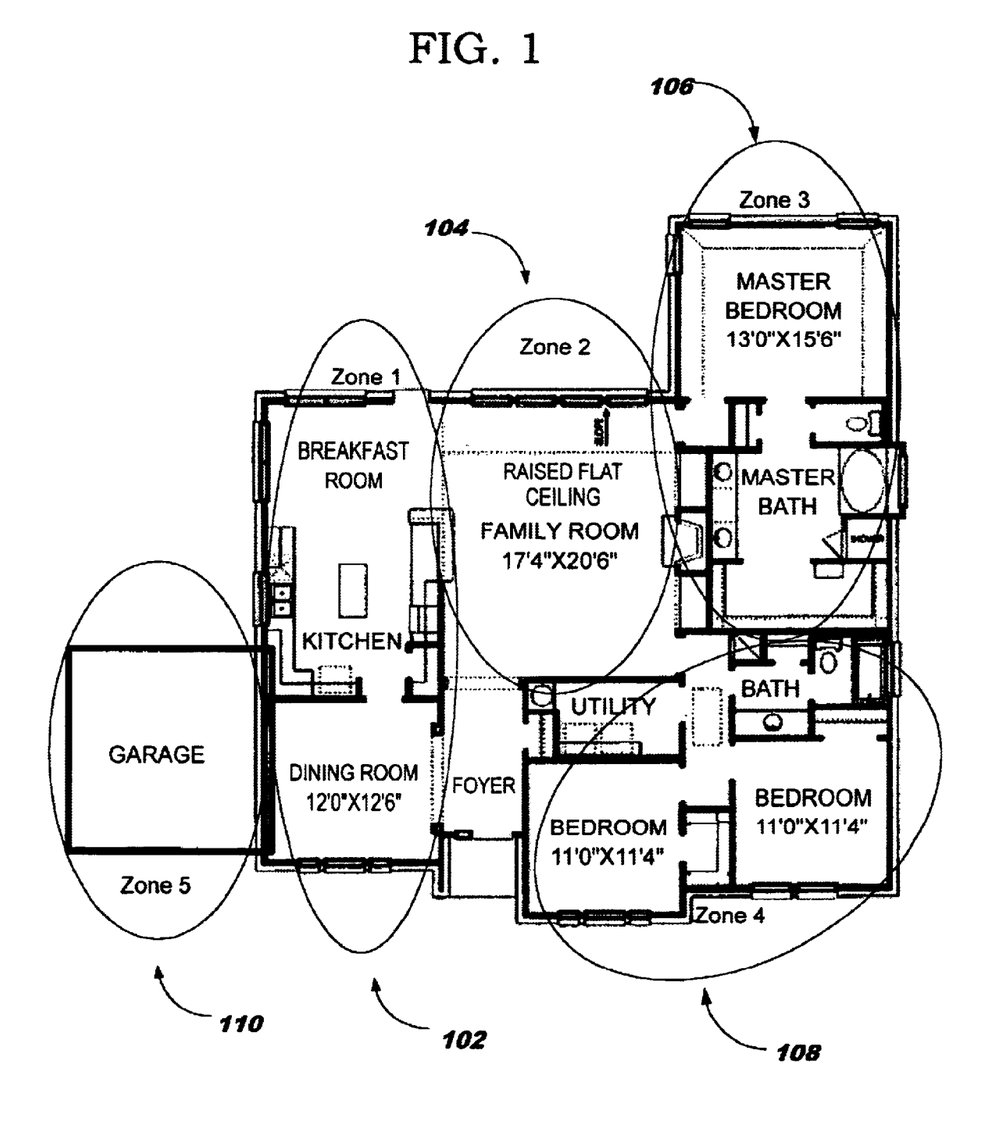
FIG. 1 is a floor plan for a typical home where the invention could be implemented through various zones of control.

With reference now to the figures, and in particular with reference to FIG. 1, a diagram is provided of a typical house divided into separate control zones. The rooms have been divided into different control zones based on the functionality of the rooms. In particular, Zone 1 102 contains the kitchen and eating areas, including a breakfast room and a dining room. Zone 2 104 contains the living area. Zone 3 106 is the master suite area that contains the master bedroom, the master bath, and a walk-in closet. Zone 4 108 is the children area and contains two bedrooms for children and a bath. Zone 5 110 is the garage area.

Although the various rooms in the zones shown in FIG. 1 were contiguous for ease of drawing, the logical zones in a home arrangement need not be physically next to each other or even on the same floor, in the case of a multi-floor house. For example, the utility room might be considered part of Zone 1 even though it is not next to Zone 1, as drawn. Also the zones may be more localized than shown. For example, Zone 1 may actually contain three separate zones, one for the dining room, one for the kitchen, and one for the breakfast room. Other zones may be decomposed in a similar manner depending on the placement of microphones and speakers.

Figure 2:
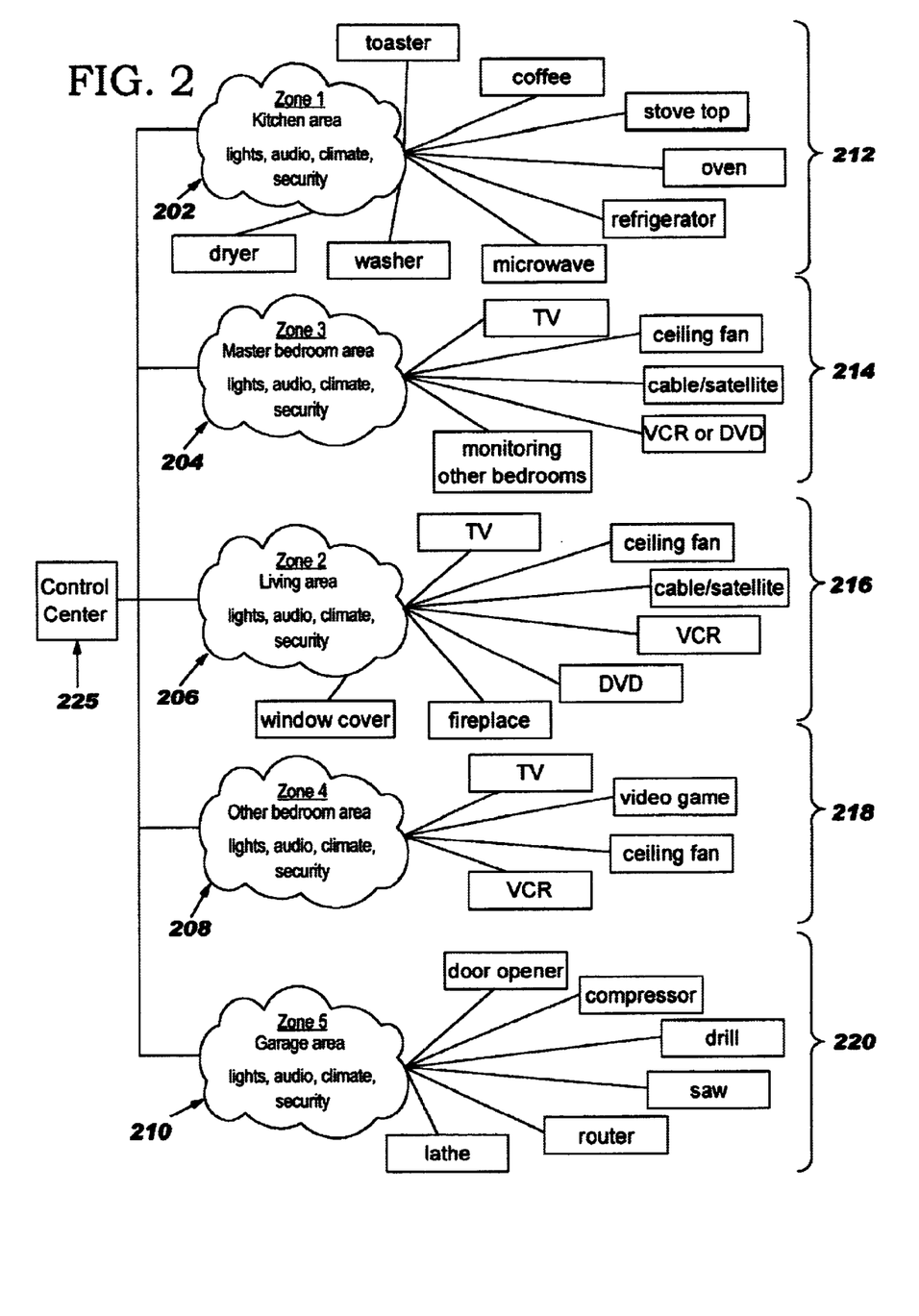
FIG. 2 shows a network of devices for the zones of control from FIG. 1 in accordance with a preferred embodiment of the invention.

With reference now to FIG. 2, the zones of control shown in FIG. 1 are organized into a service discovery network with a variety of devices shown in each zone. Each zone has its own local service discovery network, which is a normal data communications network, augmented with software implementing a service discovery protocol such as Microsoft's Universal Plug and Play or Sun Microsystem's Jini. Each of these service discovery networks can be joined, forming a federated service discovery network covering the entire house. The zones from FIG. 1 become nodes in the house network. Zones 1–5 correspond to nodes 202, 204, 206, 208, and 210, respectively. Each device or appliance is connected to one of these nodes. These devices share one or more common microphones to pick up voice commands. Some appliances are "universal", in the sense they are common to every zone. Examples of "universal" devices are lights, audio devices such as an intercom for piped in music or room-to-room communications, climate control devices, such as heating and air conditioning, and security devices. Other devices associated with Zones 1–5 are shown in groups 212, 214, 216, 218, and 220, respectively. These zones are interconnected and for some devices, such as the security system, may have a central control, such as control center 225 shown.

This invention allows control of devices through voice commands where the command and control hardware and software are shared amongst the individual devices. The service discovery mechanism locates each device. Since all devices shown require electrical power, when a device is plugged in, it can be automatically connected to the network through some protocol, such as Sun Microsystems' Jini. Other commonly occurring discover protocols are "Universal Plug and Play" by Microsoft and Service Location Protocol from the Internet Engineering Task Force (IETF). Some devices are likely to remain in a specific zone, such as the refrigerator in Zone 1 202, while other devices are portable and might be moved from zone-to-zone, such as the video game controller shown in Zone 4 208. Every device connected to the network will have to contain a microcontroller and software in order to participate in the service discovery protocol and register the device when connected to the network. The device must be able to receive (and respond to) commands or messages sent over the data communications network as a result of voice commands issued by a user.

Figure 3:
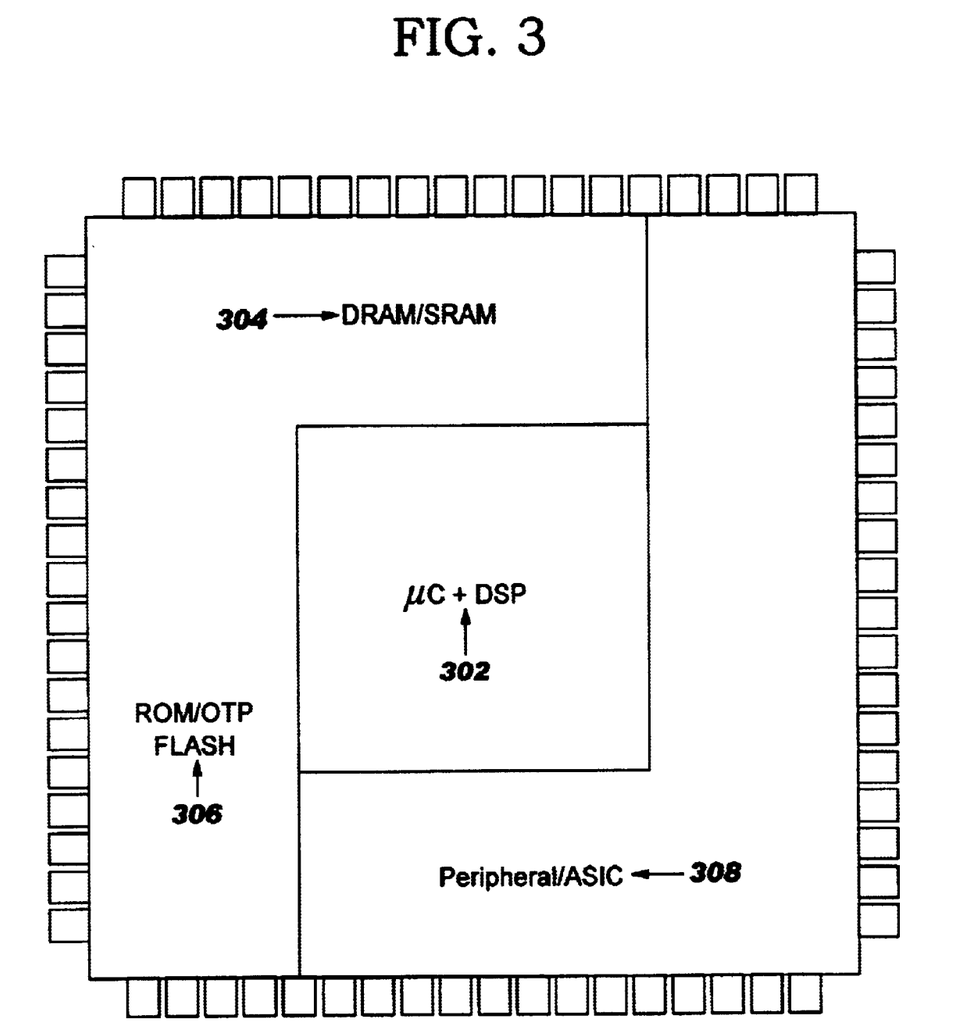
FIG. 3 is a block diagram showing the major functional regions of an embedded microcontroller that could be used to implement the current invention.

With reference now to FIG. 3, a simple layout diagram shows the major functional regions of an embedded microcontroller. The heart of a microcontroller is microcontrol ($\mu C$) logic 302 and, optionally, logic for digital signal processing (DSP). Programs and data are stored in random access memory 304, such as DRAM (dynamic random access memory) or SRAM (static random access memory). If a program component never changes, it can be stored in read only memory (ROM) 306. Some variations of ROM are one-time programmable (OTP) memory or FLASH memory. FLASH memory can be written in blocks but cannot be written a byte at a time, like random access memory. Finally, an embedded microcontroller must have an interface to peripheral devices. This may take the form of application specific integrated circuit (ASIC) 308. For this invention, it is important that the microcontroller have network access capability.

Controlling a device through voice commands is not new. For example, some electronic telephones and some cell phones allow the user to dial a number simply by speaking the name of the person to be called. What makes this invention unique is that devices can share speech recognition and speech generation hardware and software through network connections, the devices are added to a network of devices using a service discovery protocol, and the grammar and help sequences for all devices in a zone are merged into a composite grammar and composite set of help sequences.

By sharing hardware and software it becomes feasible for even simple, low-cost devices, such as the toaster shown in Zone 1 devices 212 of FIG. 2, to be able to respond to voice commands without containing all the hardware and software required for a stand-alone voice recognition and generation system. Voice generation is used to provide assistance to the user in the event a command is not recognized or to guide the user in the use of the system. This voice recognition and generation is performed in conjunction with a service discovery network. The service discovery provides the dynamics of devices entering and leaving the network, which, in turn, provides the events and data to update the command and control grammar for devices in a given zone.

Figure 4:
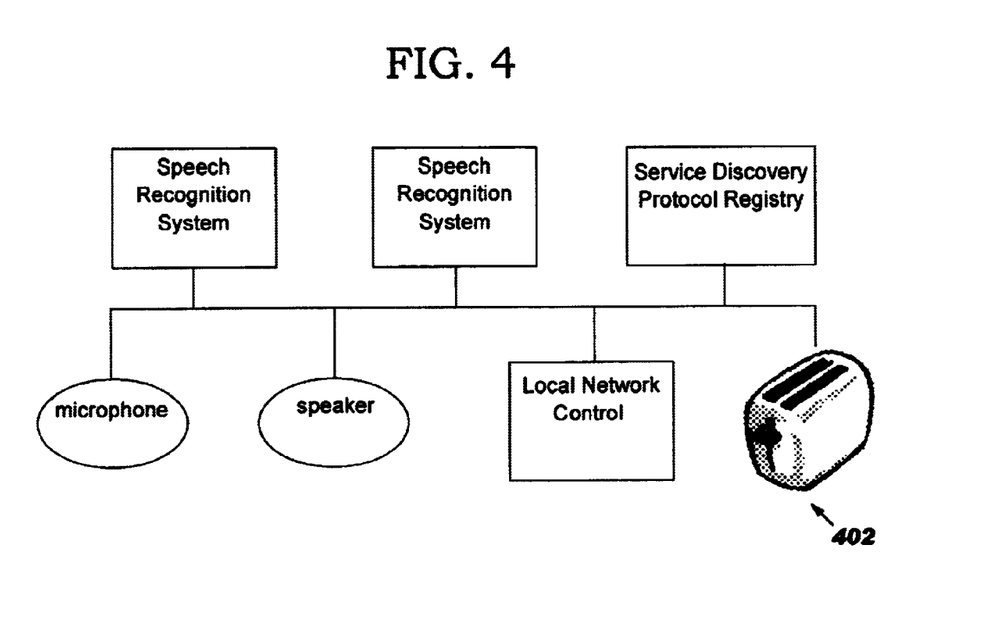
FIG. 4 shows the connection of a voice enabled toaster to the local network in the kitchen in accordance with a preferred embodiment of the invention.

With reference now to FIG. 4, a diagram shows the connection of a toaster to the local network in the kitchen. Toaster 402 contains a microcontroller, such as the microcontroller shown in FIG. 3. It is assumed that connection to the network is via the power cord, so the user simply has to plug in the toaster and signals are sent to and from the toaster using the same line that connects power. The powerline-based data communications protocols X.10 is an example protocol that can use a powerline for communications. A discovery protocol, such as Jini, Universal Plug and Play, or Service Location Protocol, causes toaster 402 to be registered with Service Discovery Protocol Registry 404.

The local network in the kitchen contains control logic 406, microphone 408, speech recognition system 410, speech generation system 412, and speaker 414. This hardware and software is shared by all of the devices in the kitchen capable of responding to voice commands. This means that each device is not forced to duplicate these facilities, thus making each device simpler and within a cost range acceptable to consumers.

Although a preferred embodiment of the invention uses the power line for communications, as one of ordinary skill in the art will appreciate, a variety of wired and wireless communications media are possible. Wired connections include, but are not limited to, a power line based system, a universal serial bus (USB), a firewire (IEEE 1394), and a proprietary wiring system. Wireless communications include, but are not limited to, an infrared data transfer, a 900 MHz cordless phone transfer, a 2.4 GHz cordless phone transfer, and a proprietary wireless system.

Figure 5:
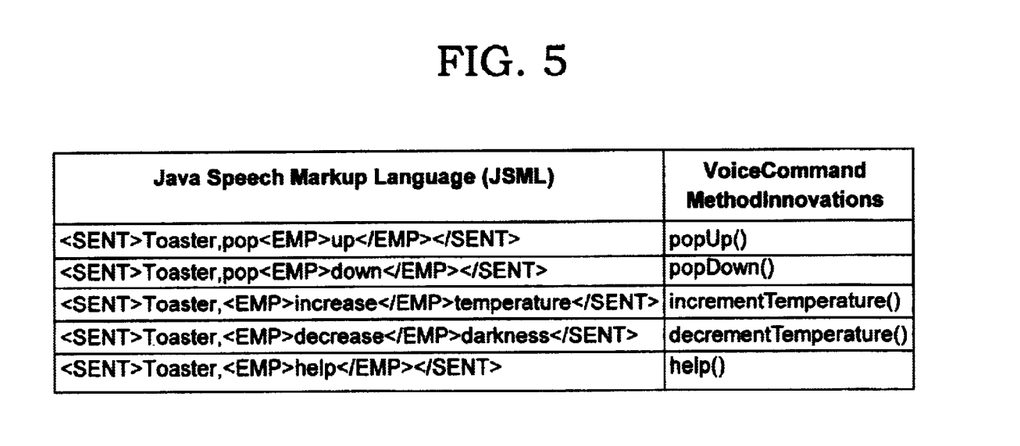
FIG. 5 shows a subset of commands recognized by the system controlling the toaster in accordance with a preferred embodiment of the invention.

With reference now to FIG. 5, a subset of commands recognized by the system controlling the toaster is shown. The left hand column shows the recognized command sequences in Java Speech Markup Language (JSML). Associated with each recognized command sequence is a Java method that can be invoked to cause the device to function as commanded. For example, the command sequence generated by "toaster pop up" results in the command and control software, working with the service discovery register, invoking the method "popUp( )". This method invocation is sent to the device and the device must be capable of carrying out the appropriate operation either electronically or mechanically. For example, the "popup( )" method at the toaster would cause the carrying tray in the toaster to be raised and the power to the heating unit to be removed. Each voice enabled device in a network would need appropriate means to carry out the operations specified by voice commands.

As one of ordinary skill in the art will appreciate, markup language protocols can be different than JSML and the programming language implementing the methods can be different than Java. It is important to note that alternative command forms might trigger the same operation. For example, the command "toaster increase temperature" causes the "incrementTemperature( )" method to be invoked. The command "toaster increase darkness" would also cause the "incrementTemperature( )" method to be invoked. The same flexibility in vocabulary could be used to make the system multilingual, such as English/Spanish/French.

This invention can be used in a speaker independent environment similar to that found in automatic telephone answering systems where any user can speak simple commands without training the system. For commands within a restricted vocabulary, such systems can achieve an acceptable rate of correct recognition. This invention can also be used with systems that provide training to recognize voice commands from individual users in order to increase the accuracy of the voice recognition system. This may be desirable in a home environment where the same residents will be using the system continually on a long term basis.

Figure 6:
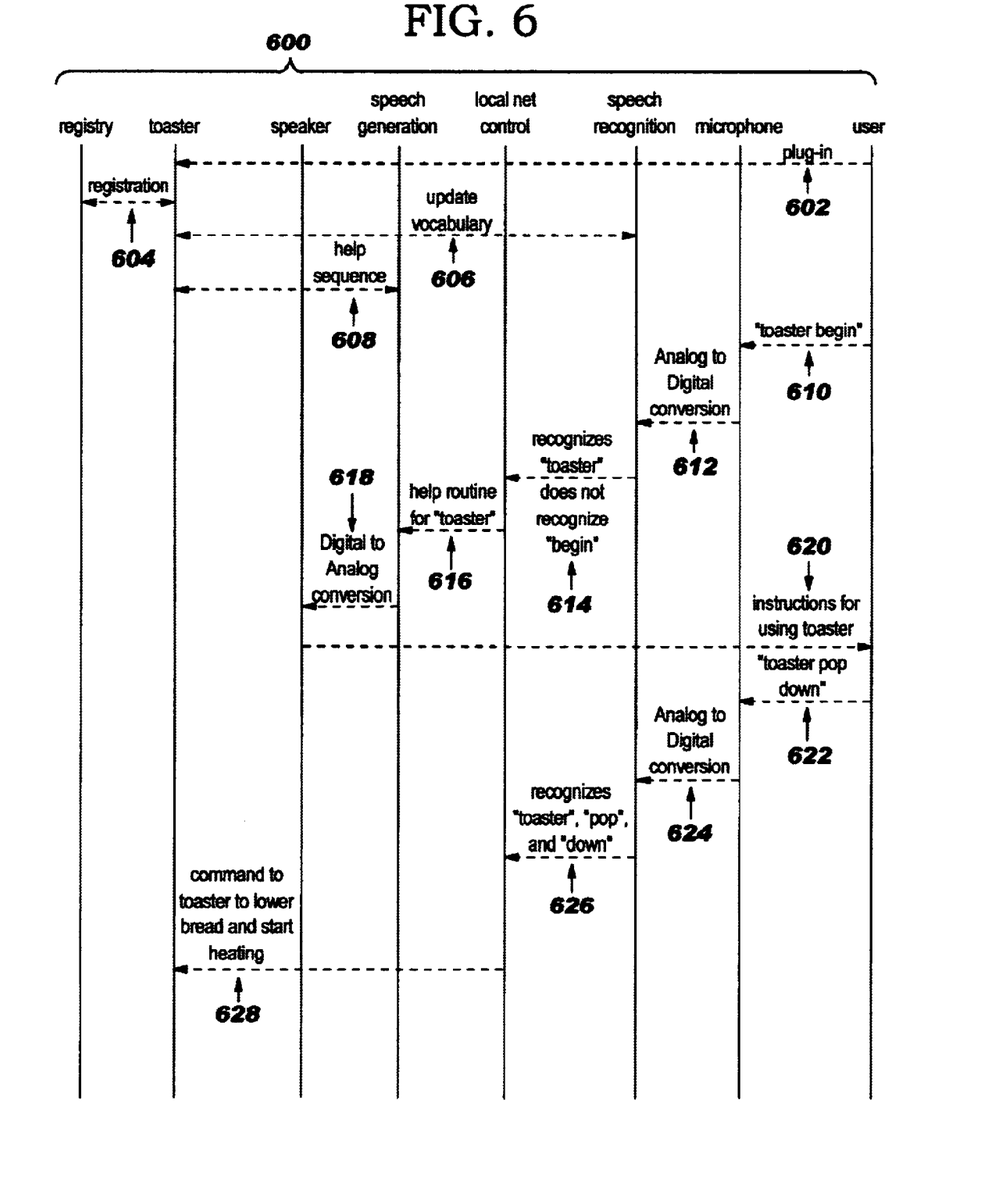
FIG. 6 illustrates a complete scenario of using a voice control system in accordance with a preferred embodiment of the invention.

FIG. 5 illustrates the correspondence between a sequence of commands recognized by speech recognition system 408 in FIG. 4 and a method invoked in the target device to cause the action to be performed. With reference now to FIG. 6, an action diagram embeds this association into a complete scenario that illustrates a typical use of the voice control system. Objects 600 include, from left to right, the registry, the toaster, the speaker, the speech generation system, the local network control, the speech recognition system, and the microphone, corresponding to objects 404, 402, 414, 412, 406, 410, and 408 in FIG. 4, respectively. The human user, shown to the right, is also an object or actor in this scenario.

The human user first plugs in the toaster (action 602). When the toaster detects it has been connected to a service discovery network, it immediately begins participating in the service discovery protocol by sending out signals for registration. A discovery protocol causes the toaster to be registered with the Service Discovery Protocol Registry (action 604). Since the toaster's registration contains the grammar sequences of recognized words, this information is installed with the speech recognition module at the time of registration (step 606). There may also be help commands and control scripts which are, registered with the speech generation unit (step 508). In FIG. 6 we assume the registration is successful.

The human then speaks the command "toaster begin" (action 610). The analog signal at the microphone is converted to a digital signal and sent to the speech recognition system (action 612). The speech recognition system identifies the device "toaster" but fails to recognize the operation "begin" (action 614). Since the operation was not recognized, a help routine for the object toaster is sent to the speech generation system (action 616). This message is converted from digital to analog and sent to the speaker (action 618). The human user listens to these instructions (action 620).

The human now knows the proper command and speaks "toaster pop down" (action 622). This analog signal is digitized (action 624) and all three words are recognized by the speech recognition system (action 626). This caused the "popDown( )" method invocation to be sent to the toaster (action 628). Action 628 corresponds to the second line of JSML to method invocation pairs shown in FIG. 5.

FIG. 6 illustrates a human user trying to issue a voice command directly to a device. The command was not recognized so the system provided instructions. The current invention can be used in an alternative mode where the user allows the system to guide the correct response pattern. This is illustrated in FIG. 7.

The kitchen zone, 202 in FIG. 2, is illustrated with three devices: toaster 702, oven 704, and microwave 706. Microphone 708 receives user commands and speaker 710 uses digitized voice to communicate with human user 712. A hypothetical dialog is shown with human user commands 714 and system responses 716. The device being controlled is microwave 706; this device has many more commands than a toaster. User 712 has elected to have the system prompt for responses.

The human user says "microwave" and then pauses. The system detects this pause and prompts the user by responding with "Normal, defrost, or special?" The user responds "defrost" and then pauses to be prompted again. The remaining dialog shown in 714 and 716 is self-evident. If human user 712 is familiar with this command sequence, then she could speak the commands directly without pauses as "microwave defrost later five fifteen PM three point two pounds."

Figure 7:
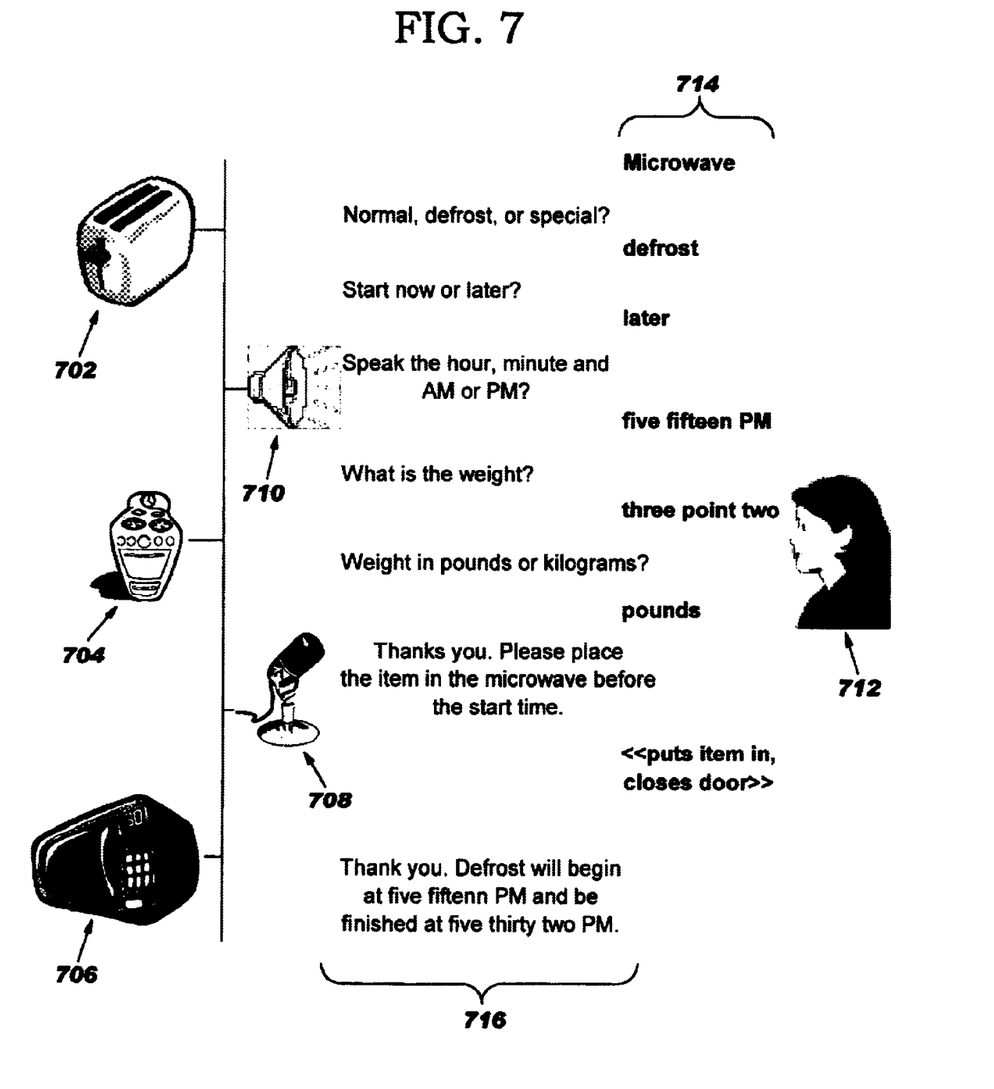
FIG. 7 illustrates an alternative scenario of using a voice control system with prompt messages in accordance with a preferred embodiment of the invention.

The dialogs illustrated in FIGS. 6 and 7 are for illustrative purposes only. The devices, vocabulary, and format of commands can vary. A simple command system might require a device name followed by an operation, such as "toaster pop down." A more sophisticated language understanding system may be able to parse a natural language sentence, such as "Please start the toaster", and determine this would invoke the method "popDown( )" on the toaster.

In a similar manner, help sequences may vary in sophistication. In a simple embodiment, all help sequences may be generated from the grammar sequences transferred from the device to the control logic at registration. For example, as shown in FIG. 5, the grammar sequences "Toaster pop up", "Toaster pop down", "Toaster increase temperature", "Toaster decrease darkness", and "Toaster help" have been registered. If the user says "toaster help", then the control logic could generate the help message: "Please select one of the following operations—pop, increase, or decrease." If the user says "pop", then the help might continue: "up or down?" These simple help sequences would only depend on the grammar sequences transferred to the network at the time of registration. As one of ordinary skill in the art will appreciate, FIG. 5 only presents a subset of possible commands for a toaster.

With a more sophisticated system, for instance, a navigation system in an automobile, specialized help sequences can be transferred from the device to the controller at the time of registration. The voice enabled devices based on a service discovery network described in this invention can be adapted to a wide variety of help scenarios.

Returning to the three cooking devices illustrated in FIG. 7, it is possible that many of the words in the vocabulary may be similar (e.g., "temperature", "increase", "decrease") and other words may be unique to a particular device (e.g., "pop" for the toaster). Each device has its own grammar sequences and corresponding device commands and this information is stored in the microcontroller, such as the microcontroller shown in FIG. 3. At the time the device is registered, this information is sent to speech recognition system 410 in FIG. 4. In other words, the information from each device in the zone is merged into a composite set of grammar sequences and corresponding device commands used by the speech recognition and generation systems. The aggregate grammar controls all the devices in the zone.

If a device is removed from the network, the information unique to that device is removed from the composite information. Detection of device removal depends on the service discovery protocol that is being used. For sophisticated devices with elaborate shutdown procedures, such as found on personal computers, commands could be sent to the central controller instructing that the device be removed from the network. Simpler devices, such as a toaster, might be unplugged before any removal signal is sent to the controller. In this case, if a command is sent to the device and the device does not respond, then the controller could search for the device in the zone and, if not found, in other zones. If the device is not found anyway, the user would be informed the device is no longer on the network and the information uniquely related to this device would be removed from the composite information.

Many service discovery protocols contain "self-healing" features that can detect devices that no longer communicate with the network and remove their entries from the registry. Jini, for example, uses a leasing mechanism. When the registry can no longer renew a lease with a device, the registry assumes the device is no longer connected to the network and purges the record of the device from its database.

Figure 8:
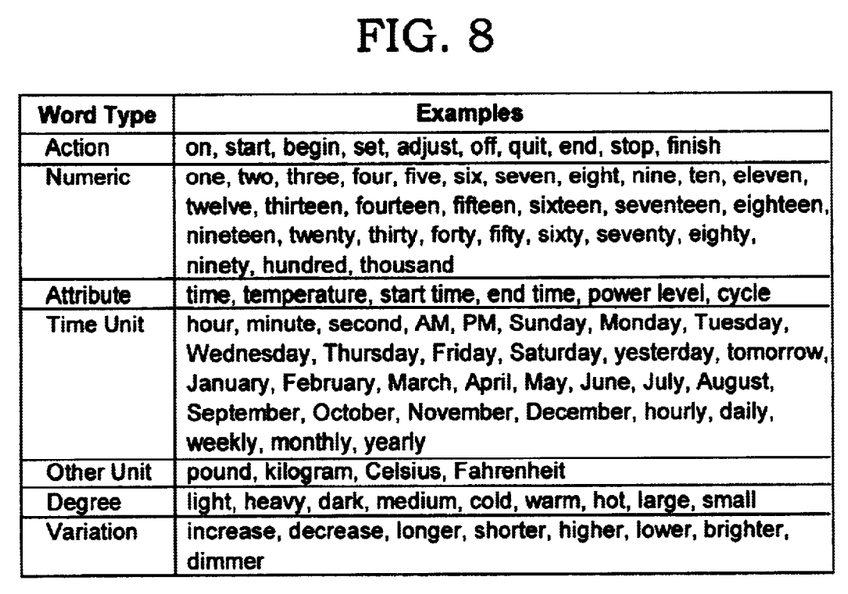
FIG. 8 shows a composite grammar after several appliances have been plugged into the kitchen zone of a home network in accordance with a preferred embodiment of the invention.

With reference now to FIG. 8, a composite grammar is shown after several appliances have been plugged into the kitchen zone of a home network. For ease of understanding, these words have been grouped into various word types. However, as one of ordinary skill in the art will appreciate, inside the system the words may be organized in a different manner, such as alphabetic order. It is assumed that the toaster, shown as object 402 in FIG. 4, has not been plugged in yet.

Figure 9:
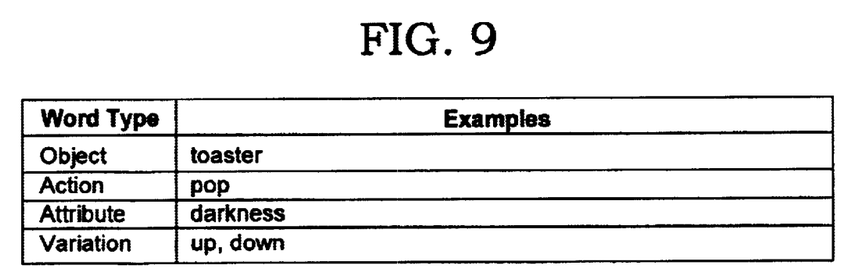
FIG. 9 illustrates some words that are unique to the toaster that have not already been included in the composite grammar shown in FIG. 8 in accordance with a preferred embodiment of the invention.

The toaster will contain within its own microcontroller the grammar sequences it will recognize and the corresponding device commands. It is possible to store help messages to guide the user. The local network controller has to translate the command sequences into method invocations, as shown in FIG. 5. All of the words in a device's vocabulary are sent to the voice recognition and voice generation systems at the time the device is registered, as shown in steps 606 and 608 in FIG. 6. FIG. 9 illustrates some words that may be unique to the toaster that have not already been included in the composite grammar. Of course, the "unique" words will depend on the words already stored in the composite grammar. If this is the first device to be connected and that grammar is empty, then every word associated with the toaster is "unique" and will be added to the composite grammar. Alternatively, there may be some words built into the base system, such as spoken numbers, that are recognized before any individual devices are plugged in. The words shown in FIGS. 4, 8, and 9 are for illustrative purposes only and are not intended to limit the scope of the disclosed invention.

The zones shown in FIG. 2 can be connected to form a federation of zones. In this manner, it would be possible to control a device in one zone while actually being present in another zone. For example, suppose the user wants to open the garage door but is currently located in the master bedroom. The correct command sequence might be "garage door open". When the speech recognition system in Zone 3 for the master suite does not recognize the device "garage door", it can query the other zones in the house to see if the device is recognized. Zone 5 would acknowledge a device named "garage door" and would be able to carry out the operation "open". This federated network could either be organized into a ring of zones with information being passed around the ring or it could be organized in a hierarchy with a central control at the house level.

Although this invention has been described in the context of a home environment, the same system and method can be used in a variety of different environments, such as an office environment, and a variety of different devices, such as a copy machine or a fax machine. The preferred embodiment of the invention uses power cords to transmit signals to and from the network, but other media could be used, including wireless media.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. For example, in the automotive industry many devices, such as audio system, navigation systems, and communication systems, are added or modified at the importer or dealership level. Each of these devices would benefit greatly from a voice command system but it is not known at the time of manufacture which devices the user will select. With the plug-and-play flexibility of a service discovery network, the voice control facilities will automatically adapt to new commands and help sequences as these voice control devices are added to the automobile. The embodiment was chosen and described in order to best explain the principles of the invention and the practical application, and to enable others of ordinary skill in the art to understand the invention for various embodiments with various modifications as are suited to the particular use contemplated.

What is claimed:

1. Method in a distributed data processing system for controlling, through voice commands, a device located in one zone of a plurality of zones, the method comprising the steps of:

registering the device with the distributed data processing system at a time the device is linked to the distributed data processing system;

receiving a set of grammar sequences and a corresponding set of device commands from the device at a time of registration;

receiving a voice command for the device in the distributed data processing system;

converting the voice command into a grammar sequence; and if the grammar sequence matches a grammar sequence in the set of grammar sequences, issuing a corresponding device command to the device.

2. The method of claim 1, wherein the set of grammar sequences and the corresponding set of device commands are received from the device via a wired connection by one of a power line based systems, a universal serial bus, a firewire, and a proprietary wiring system.

3. The method of claim 1, wherein the corresponding device command is sent to the device via a wired connection by one of a power line based system, a universal serial bus, a firewire, and a proprietary wiring system.

4. The method or claim 1, wherein the set of grammar sequences and the corresponding set of device commands are received from the device via a wireless connection by one of an infrared data transfer, a 900 MHz cordless phone transfer, a 2.4 GHz cordless phone transfer, and a proprietary wireless system.

5. The method of claim 1, wherein the corresponding device command is sent to the device via a wireless connection by one of an infrared data transfer, a 900 MHz cordless phone transfer, a 2.4 GHz cordless phone transfer, and a proprietary wireless system.

6. The method of claim 1, wherein the device is registered via a service discovery protocol.

7. The method of claim 1, wherein the grammar sequences and the corresponding device commands received from the device are merged into a composite set of grammar sequences and corresponding device commands based on grammar sequence and corresponding device commands received from a plurality of device in the zone.

8. The method of claim 7, wherein when a link between the device and the distributed data processing system is no longer established, the grammar sequences and the corresponding device commands uniquely associated with the device are removed from the composite set of grammar sequences and corresponding device commands.

9. The method of claim 1, wherein the distributed data processing system includes voice recognition hardware and software for a zone in the plurality of zones and wherein the voice recognition hardware and software is shared by a plurality of devices in the zone.

10. The method of claim 1, wherein the distributed data processing system includes voice generation hardware and software for a zone in the plurality of zones and wherein the voice generation hardware and software is shared by a plurality of devices in the zone.

11. The method of claim 1, wherein the converting a voice command into a grammar sequence includes determining if a device name in a grammar sequence is recognized and, if the device name is not recognized, the grammar sequence is forwarded to a second zone from the plurality of zones.

12. The method of claim 1, wherein converting a voice command into a grammar sequence includes determining in a device name in a grammar sequence is recognized and, if the device name is recognized but the grammar sequence is incomplete, help messages are output to provide the alternative choices available to complete the voice command.

13. A distributed data processing system for controlling, through voice commands, a device located in one zone of a plurality of zones, the distributed data processing system comprising:

registering means for registering the device with the distributed data processing system at a time the device is linked to the distributed data processing system;

receiving means for receiving a set of grammar sequences and a corresponding set of device commands from the device at a lime of registration;

detecting means for detecting a voice command for the device in the distributed data processing system;

converting means for converting the voice command into a grammar sequence; and if the grammar sequence matches a grammar sequence in the set of grammar sequences, a issuing means for issuing a corresponding device command to the device.

14. The distributed data processing system of claim 13, wherein the set of grammar sequences and the corresponding set of device commands are received from the device via a wired connection by one of a power line based system, a universal serial bus, a firewire, and a proprietary wiring system.

15. The distributed data processing system of claim 13, wherein the corresponding device command is sent to the device via a wired connection by one of a power line based system, a universal serial bus, and firewire, and a proprietary wiring system.

16. The distributed data processing system of claim 13, wherein the set of grammar sequences and the corresponding set of device commands are received from the device via a wireless connection by one of an infrared data transfer, a 900 MHz cordless phone transfer, a 2.4 GHz cordless phone transfer, and a proprietary wireless system.

17. The distributed data processing system of claim 13, wherein the corresponding device command is sent to the device via a wireless connection by one of an infrared data transfer, a 900 MHz cordless phone transfer, a 2.4 GHz cordless phone transfer, and a proprietary wireless system.

18. The distribute data processing system of claim 13, wherein the registering means is a service discovery protocol.

19. The distributed data processing system of claim 13, wherein the grammar sequences and the corresponding device commands received from the device are merged into a composite set of grammar sequences and corresponding device commands based on grammar sequences and corresponding device commands received from a plurality of devices in the zone.

20. The distributed data processing system of claim 19, wherein when a link between the device and the distributed data processing system is no longer established, the grammar sequences and the corresponding device commands uniquely associated with the device are removed from the composite set of grammar sequences and corresponding device commands.

21. The distributed data processing system of claim 13, wherein voice recognition hardware and software for a zone in the plurality of zones are shared by a plurality of devices in the zone.

22. The distributed data processing system of claim 13, wherein voice generation hardware and software for in zone in the plurality of zones are shared by a plurality or devices in the zone.

23. The distributed data processing system of claim 13, wherein the converting means for converting a voice command into a grammar sequence includes determining, if a device name in a grammar sequence is recognized and, if the device name is not recognized, the grammar sequence is forwarded to a second zone from the plurality of zones.

24. The distributed data processing system of claim 13, wherein the converting means for converting a voice command into a grammar sequence includes determining if a device name in a grammar sequence is recognized and, if the device name is recognized but the grammar sequence is incomplete, help messages are output to provide the alternative choices available to complete the voice command.

25. A computer program product on a computer-realable medium for controlling, through voice commands, a device located in one zone of a plurality of zones, the computer program product comprising:

instructions for registering the device will the distributed data processing system at a time the device is linked to tile distributed data processing system;

instructions for receiving a set of grammar sequences and a corresponding set of device commands from the device at a time of registration;

instructions for detecting an voice command for the device in the distributed data processing system;

instructions for converting the voice command into a grammar sequence; and if the grammar sequence matches a grammar sequence in the set of grammar sequences, instruction for issuing a corresponding device command to the device.

26. The computer program product of claim 25, wherein the set of grammar sequences and the corresponding set of device commands are received from the device via a wired connection by one of a power line based system, a universal serial bus, a firewire, and a proprietary wiring system.

27. The computer programing product of claim 25, wherein the corresponding device command is sent to the device via a wired connection by one of a power line based system, a universal serial bus, a firewire, until a proprietary wiring system.

28. The computer program product of claim 25, wherein the set of grammar sequences and the corresponding set of device commands are received from the device via a wireless connection by one of an infrared data transfer, a 900 MHz cordless phone transfer, a 2.4 GHz cordless phone transfer, and a proprietary wireless system.

29. The computer program product of claim 25, wherein the corresponding device command is sent to the device via a wireless connection by one of an infrared data transfer, a 900 MHz cordless phone transfer, a 2.4 GHz cordless phone transfer, and a proprietary wireless system.

30. The computer program product of claim 25, wherein the instructions for registering the device are a service discovery protocol.

31. The computer program product of claim 25, wherein instructions merger the grammar sequences and the corresponding device commands received from the device into a composite set of grammar sequence and corresponding device command based on grammar sequences and corresponding device commands received from a plurality of devices in the zone.

32. The computer program product of claim 31, wherein when a link between the device and the distributed date processing system is no longer established, instructions remove the grammar sequences and the corresponding device commands uniquely associated with the device from the composite set of grammar sequences and corresponding device commands.

33. The computer program product of claim 31, wherein instructions for voice recognition for a zone in the plurality of zones are shared by a plurality of devices in the zone.

34. The computer program product of claim 31, wherein instructions for voice generation for a zone in the plurality of zones are shared by a plurality of devices in the zone.

35. The computer program product of claim 31, wherein instructions for converting a voice command into a grammar sequence includes determining if a device name in a grammar sequence is recognized and, if the device name is not recognize, the grammar sequence is forwarded to a second zone from the plurality of zones.

36. The computer program product of claim 31, wherein instructions for converting a voice command into a grammar sequence includes determining if a device name in a grammar sequence is recognized and, if the device name is recognized but the grammar sequence is incomplete, help messages are output to provide the alternative choices available to complete the voice command.

* * * * *